United States Patent
Li et al.

(10) Patent No.: US 6,966,685 B2
(45) Date of Patent: Nov. 22, 2005

(54) DISTRIBUTED LIGHT ILLUMINATION SYSTEM

(75) Inventors: Ying Hung Li, Kowloon (CN); Ashley Min Hang Pun, Kowloon (CN); Chi Choy Wong, Kowloon (CN); Sin Wing Chan, Kowloon (CN); Derek Chi Hang Louie, Kowloon (CN); Li Man Li, Kowloon (CN)

(73) Assignee: World Hint Limited, Kowloon (CN)

( * ) Notice: Subject to any disclaimer, the term of this patent is extended or adjusted under 35 U.S.C. 154(b) by 0 days.

(21) Appl. No.: 10/787,514

(22) Filed: Feb. 26, 2004

(65) Prior Publication Data

US 2005/0190574 A1    Sep. 1, 2005

(51) Int. Cl.[7] .............................................. F21V 7/04
(52) U.S. Cl. .................... 362/616; 362/551; 362/610
(58) Field of Search ............................ 362/551, 555, 362/556, 559, 560, 600, 607, 608, 609, 610, 362/616, 620, 628, 625; 385/34, 43, 46, 901, 385/88, 48, 36, 37, 31, 123, 133, 15; 349/65

(56) References Cited

U.S. PATENT DOCUMENTS

| | | | |
|---|---|---|---|
| 3,535,018 A | 10/1970 | Vasilatos | 385/115 |
| 4,195,907 A | 4/1980 | Zamja et al. | 385/125 |
| 4,344,110 A * | 8/1982 | Ruediger | 362/560 |
| 4,422,719 A | 12/1983 | Orcutt | 385/123 |
| 4,466,697 A | 8/1984 | Daniel | 385/123 |
| 4,662,728 A | 5/1987 | Whitehead | 385/123 |
| 4,750,798 A | 6/1988 | Whitehead | 385/133 |
| 4,834,495 A | 5/1989 | Whitehead et al. | 385/123 |
| 4,906,070 A | 3/1990 | Cobb, Jr. | 359/834 |
| 4,936,668 A * | 6/1990 | Mori | 385/31 |
| 5,083,549 A * | 1/1992 | Cho et al. | 600/108 |
| 5,276,693 A * | 1/1994 | Long et al. | 372/6 |
| 5,418,384 A | 5/1995 | Yamana et al. | |
| 5,434,754 A | 7/1995 | Li et al. | |
| 5,542,017 A * | 7/1996 | Koike | 385/123 |
| 5,664,862 A * | 9/1997 | Redmond et al. | 362/625 |
| 6,031,958 A | 2/2000 | McGaffigan | 385/146 |
| 6,160,948 A | 12/2000 | McGaffigan | 385/146 |
| 6,337,946 B1 | 1/2002 | McGaffigan | 385/146 |
| 6,595,673 B1 * | 7/2003 | Ferrante et al. | 362/551 |
| 6,829,412 B2 * | 12/2004 | Li | 385/31 |

FOREIGN PATENT DOCUMENTS

JP    11084135 A  *  3/1999  ............ G02B 6/00

* cited by examiner

*Primary Examiner*—Stephen Husar
*Assistant Examiner*—Hargobind S. Sawhney
(74) *Attorney, Agent, or Firm*—Alix, Yale & Ristas, LLP

(57) ABSTRACT

An illumination system employs a light distribution cylinder with an exterior surface in the form of a plurality of progressively smaller-diameter cylindrical steps. The outside surface of each cylindrical step is interrupted by V-shaped grooves perpendicular to the axis of the cylinder. Each surface of these V-shaped grooves acts to internally reflect divergent light from a light source positioned at the end of the tube. The light distribution cylinders may be solid or hollow and configured with bilateral symmetry to receive light from either end. The illumination system rearranges divergent directional light from a light source into non-directional light emitted in a cylindrical pattern useful for area illumination.

12 Claims, 4 Drawing Sheets

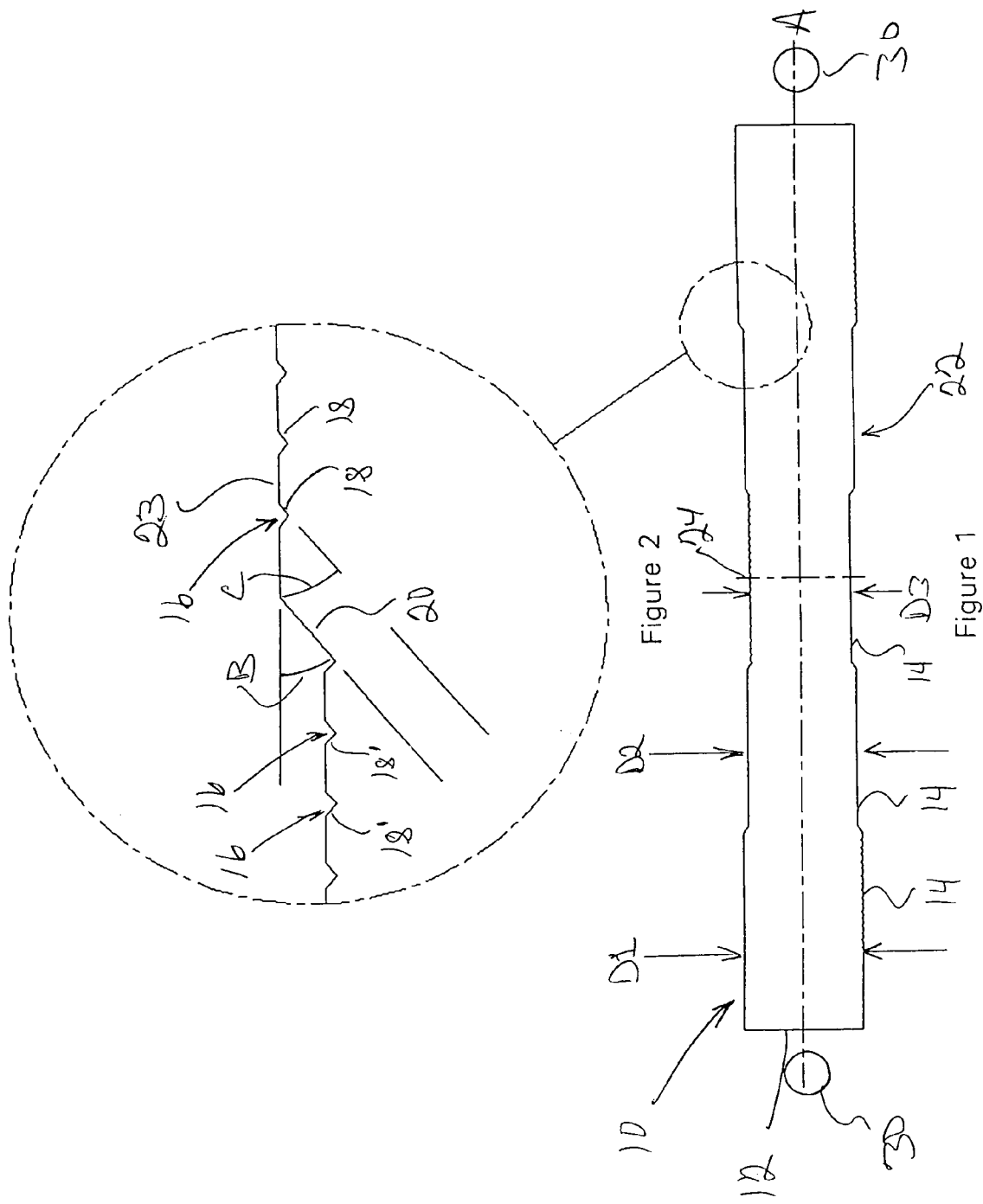

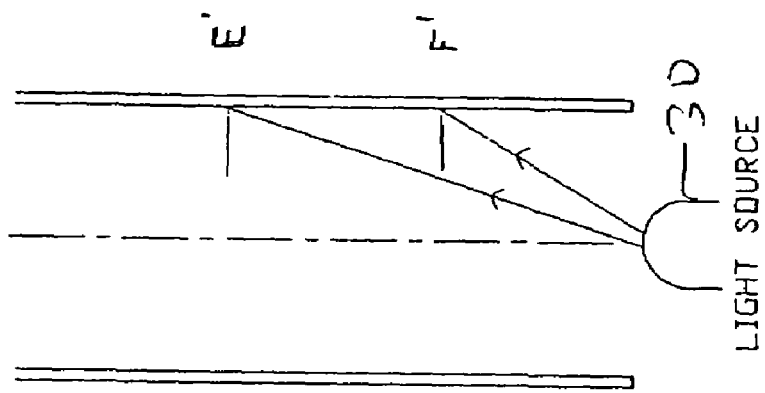
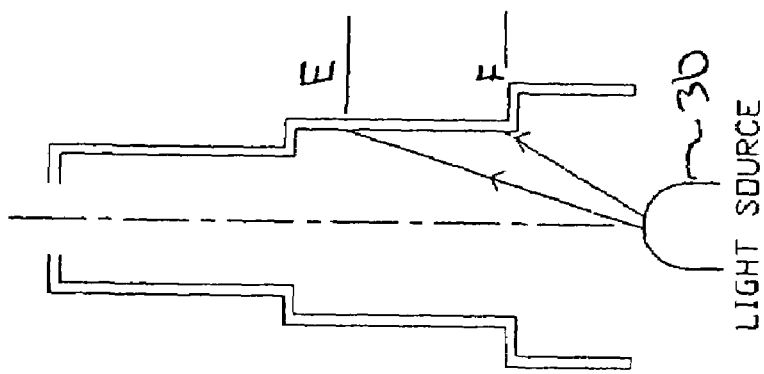
Figure 5

DISTRIBUTED LIGHT ILLUMINATION SYSTEM

FIELD OF THE INVENTION

The invention relates to the distribution of light for illumination purposes and more specifically to particular light-transmissive structures configured to redirect and distribute light from one or more directional light sources.

BACKGROUND OF THE INVENTION

Optically transmissive components used to transmit and redirect light from point light sources are widely used. Back lit panels for LCD displays are a common example. These mechanisms redirect light from a point light source along the panel by positioning a light source so that its light rays are transmitted in the panel by internal reflection. The light sources typically employed for the back lighting of LCD displays are small light-emitting diodes (LEDs). Recent advances in LED technology have increased the light output and efficiency of these light sources. LEDs are now employed for many directional lighting applications such as reading lamps, flashlights, headlamps, etc. LEDs are point light sources emitting light over a range of angles surrounding an optical axis. The directional light of an LED is easily adapted to directional lighting applications. However, non-directional lighting such as that provided by a fluorescent tube has heretofore been difficult to achieve using LEDs.

U.S. Pat. No. 4,422,719 to Orcutt discloses a light pipe with a translucent coating over a core material which allows the light transmitted axially to be dispersed radially around the light pipe. The translucent layer causes the entire width of the light pipe to be illuminated.

U.S. Pat. No. 4,466,697 to Daniel discloses another type of light pipe consisting of an extruded material including co-extruded reflective particles. These particles randomly reflect light transmitted in the light pipe so it emerges in a non-directional pattern. The light emitted from this prior art light pipe is random and consequently the entire light pipe is illuminated. U.S. Pat. No. 4,195,907 to Zamja et al employs dispersed air bubbles in an extruded optical fiber that function similarly to the reflective particles of Daniel.

U.S. Pat. No. 3,535,018 to Vasilatos discloses an optical fiber that has notches cut into the fiber to provide reflective surfaces. Light is emitted from the fiber wherever the notches interrupt the outer layer of the optical fiber. The notches are positioned in a random manner, causing the entire fiber to be illuminated.

U.S. Pat. Nos. 6,031,958; 6,160,948 and 6,337,946 to McGaffigan disclose optical light pipes with a particular pattern of reflecting surfaces arranged to produce a light emission pattern that looks like a laser is traversing the length of the light pipe. McGaffigan discloses hollow light pipes in which the inside surface of the light pipe is formed into a plurality of prismatic surfaces. The prismatic surfaces define a curved surface either on the inside or the outside of the prismatic element. The prismatic surfaces redirect light rays in a plurality of planes that are perpendicular to a tangent to the curved surface defined by the prismatic elements. This arrangement of optical elements creates an illusion that light is emitted from a centerline of the light pipe, when the light is actually emitted from an exterior surface of the prismatic element. The McGaffigan patents disclose a particular pattern of prismatic elements calculated to produce the desired laser-like light emission pattern. This laser-like light emission pattern may not be the most efficient or least costly to manufacture for an illumination system.

SUMMARY OF THE INVENTION

An object of the present invention is to provide a new and improved illumination system including a light guide providing a uniform, non-directional, axially extending light emission pattern.

This and other objects of the present invention are accomplished by employing a rod-like or tubular light guide whose exterior surface is divided into a plurality of concentric cylindrical steps. The steps decrease in diameter as they progress away from a light source arranged to emit divergent directional light longitudinally into the light guide. The outside surface of each step defines a plurality of inwardly directed grooves, the surfaces of which form reflecting surfaces that internally reflect light transmitted in the light pipe. The path of the divergent directional light from the LED light source is altered by reflection from the internal reflecting surface to a direction which allows it to escape the light distribution cylinder at a point axially spaced from the light source. The light distribution cylinder conducts light from the LED axially until the light is diverted to an exit path by one of the reflecting surfaces. The result is light emitted substantially uniformly along the length of the light distribution cylinder in a non-directional pattern that is useful for illumination purposes.

DESCRIPTION OF THE DRAWINGS

FIG. 1 is an exterior side view of a light distribution cylinder exemplary of aspects of the present invention;

FIG. 2 is an enlarged partial view of the light distribution cylinder of FIG. 1;

FIG. 5 contrasts a sectional view of a prior art light source (b) with a sectional view of a light source (a) according to aspects of the present invention.

DETAILED DESCRIPTION OF EXEMPLARY EMBODIMENTS

Figure 3:
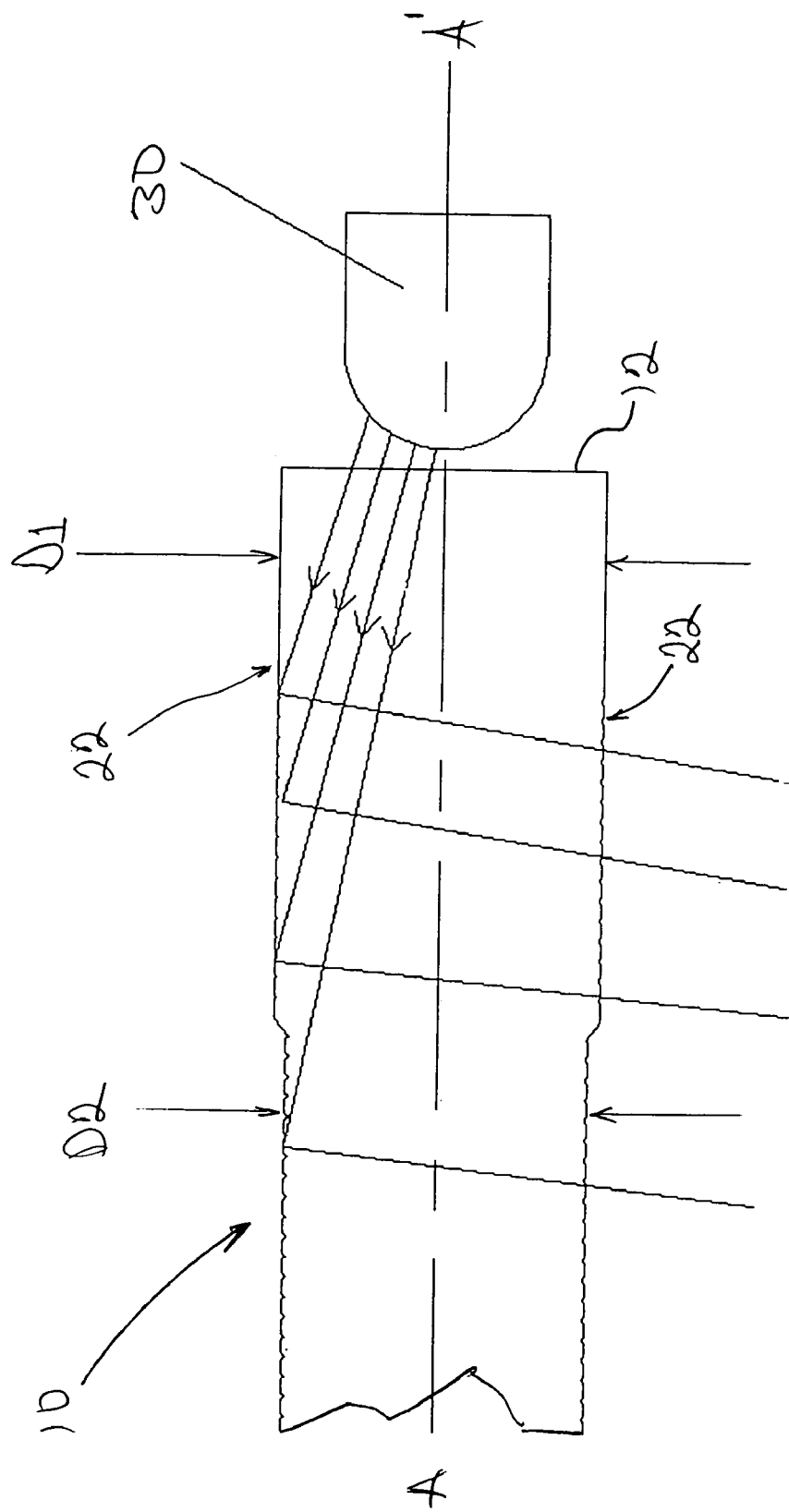
FIG. 3 is a partial side view of the light distribution cylinder of FIG. 1 in conjunction with a light source according to aspects of the present invention.

Exemplary embodiments of an illumination system in accordance with aspects of the present invention will be described with reference to FIGS. 1–4. FIG. 1 illustrates an exemplary light distribution cylinder according to aspects of the present invention. The illustrated light distribution cylinder 10 is a molded solid rod of optical-grade plastic. The exterior surface 22 of the light distribution cylinder 10 is divided into a sequence of progressively smaller diameter cylindrical steps 14. The light distribution cylinder 10 has longitudinal ends 12 at a first diameter D1. As the light distribution cylinder 10 progresses away from each end 12, subsequent steps 14 have smaller diameters D2, D3. The exemplary light distribution cylinder 10 illustrated in FIG. 1 includes a sequence of three steps 14 of progressively smaller diameter from one end 12 to the center 24. The middle step 14 is centered on the center 24 of the cylinder 10.

The outside surface 23 of each step 14 is interrupted by a plurality of V-shaped grooves 16. The V-shaped grooves 16 are perpendicular to the axis A of the rod 10 and are defined between frustoconical surfaces 18, 18'. The frustoconical surfaces 18, 18' provide reflecting surfaces that internally reflect divergent light transmitted into the light distribution cylinder 10 from a light source 30 arranged adjacent the end 12 of the cylinder as shown in FIG. 3. For a solid light distribution cylinder 10, the light source 30 is arranged with its optical axis A' aligned with the axis A of the light distribution cylinder. Divergent light from light source 30 is axially transmitted down the light distribution cylinder 10 until it is internally reflected from a frustoconical reflecting surface 18, 18'. These reflecting surfaces 18, 18' are arranged to redirect light to a path which will result in the light exiting the light distribution cylinder at a point axially spaced from the light source 30.

The stepped configuration of the exterior surface of the light distribution cylinder serves to make light emission from the cylinder more uniform. The theory behind the increased uniformity of light emission is best explained with reference to FIGS. 5(a) and 5(b). FIG. 5(b) shows a prior art cylindrical light pipe with a light source aligned with its axis. Divergent light from the light source impacts the cylinder at points E', F' axially spaced from each other and from the light source 30. FIG. 5(a) illustrates an exaggerated stepped cylinder according to aspects of the present invention and a light source aligned with the axis of the cylinder. Divergent light from the light source impacts the stepped cylinder at points E and F, axially spaced from each other and from the light source. The axial distance between points E and F is smaller than the axial distance between points E' and F'. Since the same quantity of light is impacting the cylinder in a smaller axial space, it follows that the intensity of light emission from this portion of the cylinder shown in FIG. 5(a) is brighter than the portion of the cylinder between E', F' of FIG. 5(b). The proportions of the stepped cylinder shown in FIG. 5(a) are exaggerated for purposes of illustration.

Figure 4:
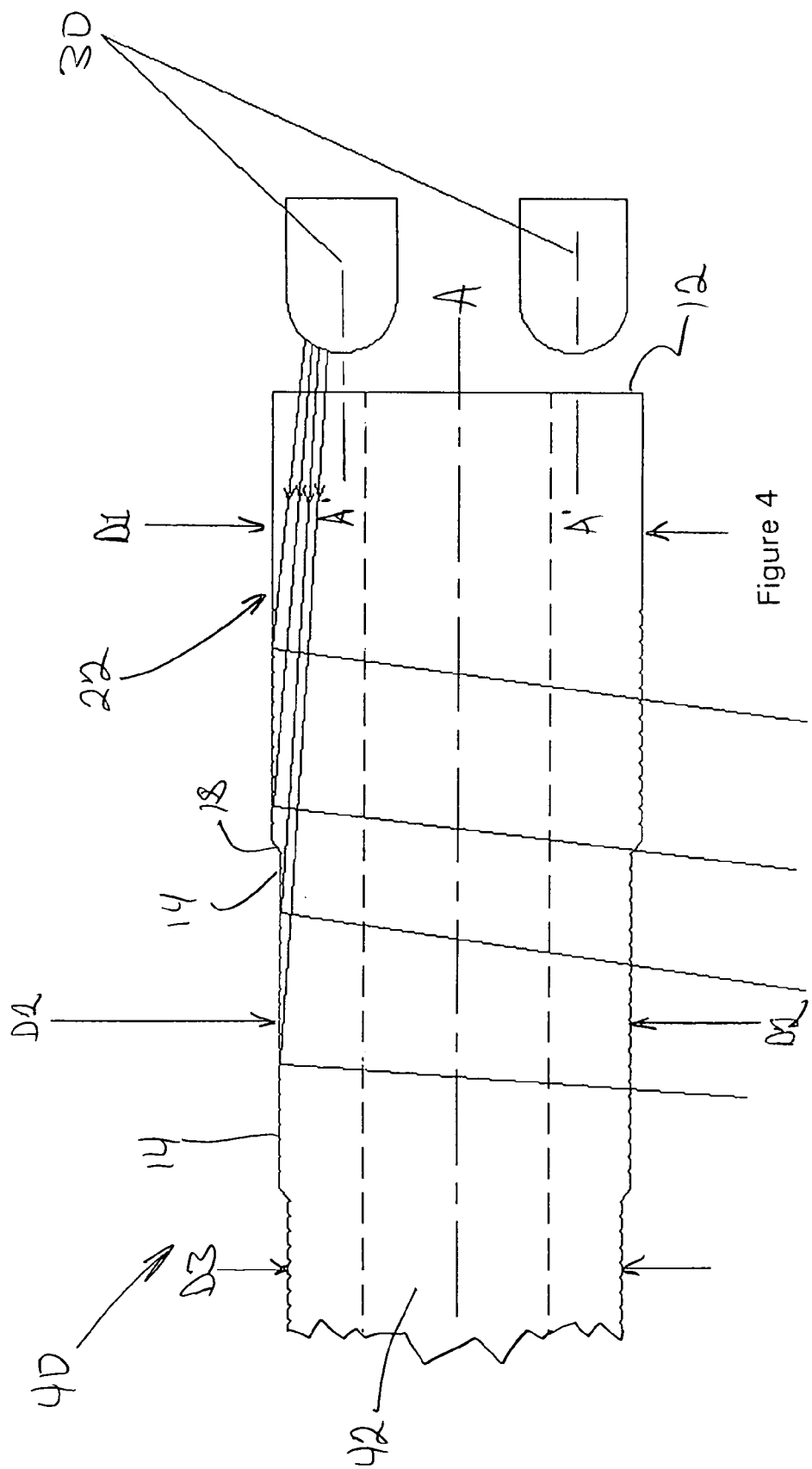
FIG. 4 is a partial side view of an alternative light distribution cylinder in functional conjunction with two light sources according to aspects of the present invention.

FIG. 4 illustrates a further alternative embodiment of an illumination system in accordance with aspects of the present invention. The light distribution cylinder 40 of FIG. 4 is a thick-walled, hollow tube defining an axial cylindrical space 42. The exterior surface 22 of the light distribution cylinder 40 is configured as a sequence of successively smaller diameter cylindrical steps 14 having the same general functionality as the steps 14 of light distribution cylinder 10 of FIGS. 1 and 3. Multiple light sources 30 are arranged with their optical axes A' aligned with the thick wall of the light distribution cylinder 40. An object of this arrangement is to transmit light from the light sources 30 into the optically transmissive material of the light distribution cylinder 40 for axial transmission. As shown in FIG. 4, divergent light from the light source 30 is axially transmitted in the wall of the light distribution cylinder 40 until it encounters a reflecting surface 18, 18' on one of the steps 14. The reflective surfaces 18, 18' redirect the light to a path that will cause it to exit the light distribution cylinder at a point axially spaced from the light sources 30. This arrangement produces an illuminated light distribution cylinder having a non-directional light emission pattern along its length. Such a pattern is useful for area illumination.

The diameter of the light distribution cylinders 10, 40 is reduced in stepwise fashion as the cylinder progresses away from its ends 12. This bilaterally symmetrical configuration allows light to be input from both ends of the light distribution cylinder 10, 40 as shown in FIG. 1. An angled, frustconical connecting surface 20 extends between the progressively smaller diameter steps 14. Frustconical connecting surface 20 is arranged at an angle B relative to the outside surfaces 23 of the steps 14. Angle B is equal to the angular orientation of reflecting surface 18 so that connecting surface 20 provides a light-diverting internal reflecting surface. As best seen in FIG. 2, the connecting surface forms one side of the first groove 16 of a subsequent reduced-diameter step 14. In this manner, substantially all of the stepped exterior surface of the light distribution cylinders 10, 40 serve the light distribution function. It should be noted that frustconical connecting surface 20 is angled to divert light from the light source closest to it and that connecting surfaces 20 of the other lateral portion of the light distribution cylinder have an opposite angular orientation.

The angular orientation of the reflecting surfaces are selected so that divergent light from the light source 30 is incident upon the reflecting surfaces at an angle greater than the critical angle for the material of the light distribution cylinder 10, 40. The determination of the critical angle, and thus, the optimal angle for the reflecting surfaces 18, 18' can be done by Snell's law, $n_m \sin i_{m} = n_a \sin i_a$, where:

$n_m$=refractive index of a specific material of the cylinder
$i_m$=critical angle for the material
$n_a$=refractive index of air
$i_a$=angle of refraction in air=90°

Critical angle for a specific material can be calculated:

$$\text{Critical Angle} = \sin^{-1}(1/n_m)$$

To produce the desired total internal reflection, the angle of incidence of the divergent light on the reflecting surfaces 18, 18' must exceed the critical angle for the light distribution cylinder material. The critical angle affects the shape of the grooves 16 in the light distribution cylinder 10. For a groove of a given depth, a larger included angle between the reflecting surfaces 18, 18' results in a larger reflecting surface that occupies a larger portion of the cylinder exterior surface 22. Thus, after calculation of the critical angle and selection of the groove depth, the number of grooves per unit of cylinder length can be determined. The selected angular orientation B for the reflecting surfaces 18, 18' must account for shrinkage (if any) in the material used to construct the light distribution cylinder.

According to an aspect of the present invention, the angular orientation of the reflecting surfaces 18, 18', once calculated, is used for all of the grooves along the length of the light distribution cylinder 10. For the illustrated embodiment, the distance between adjacent grooves 16 is approximately 0.5 mm.

Taken together, the structural features of light distribution cylinders 10, 40 rearrange the divergent directional light from the light sources 30 into a nondirectional cylindrical radiation pattern similar to that of a fluorescent tube. According to aspects of the present invention, preferred light sources are light-emitting diodes (LEDs). These encapsulated light sources are extremely durable and efficient. Light distribution cylinders in accordance with aspects of the present invention allow LEDs and their directional divergent light to be employed in applications that formerly required fragile fluorescent tubes and their associated bulky ballast circuitry. The energy efficiency of LEDs is also an improvement over fluorescent lights of equivalent output. In battery-operated devices, this improved energy efficiency dramatically extends battery life.

While exemplary embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. An illumination system comprising:
an encapsulated light source which produces divergent light rays when energized; and
an optically transmissive light distribution cylinder having a first end at a first diameter and an exterior surface in the form of a sequence of progressively smaller diameter cylindrical steps axially extending from said first end, each said step having an outside surface including a plurality of axially spaced generally V-shaped grooves, each said groove including at least one generally frusto-conical reflecting surface extending radially inwardly from said outside surface at an angle α,
wherein said light source is arranged to deliver said divergent light rays into the first end of said light distribution cylinder for axial transmission therein, at least a portion of said divergent light rays being incident upon said reflecting surface said angle α being calculated to cause internal reflection of said divergent light rays, whereby the internally reflected light rays emerge from said exterior surface.

2. The illumination system of claim 1, wherein said cylinder is molded from optically transmissive plastic.

3. The illumination system of claim 1, wherein said cylinder comprises a wall defining an axial cylindrical space.

4. The illumination system of claim 3, wherein said light source has an optical axis radially offset from said cylindrical space and aligned with said wall at said cylinder first end.

5. The illumination system of claim 1, wherein said cylinder is solid.

6. The illumination system of claim 5, wherein said light source has an optical axis aligned with an axis of said cylinder.

7. The illumination system of claim 1, wherein said light source is an LED.

8. The illumination system of claim 1, wherein said light source is a plurality of LEDs.

9. The illumination system of claim 1, wherein adjacent steps are connected by frusto-conical transition surfaces.

10. The illumination system of claim 1, wherein said cylinder has a second end at said first diameter and said exterior surface includes a second sequence of progressively smaller diameter cylindrical steps axially extending from said second end to meet the sequence of progressively smaller diameter steps axially extending from said first end, the steps of said second sequence being substantially identical to the steps of said first sequence.

11. The illumination system of claim 10, comprising a second light source arranged to deliver divergent light rays into the second end of said light distribution cylinder.

12. The illumination system of claim 1, wherein said light distribution cylinder is surrounded by air, said light distribution cylinder has an index of refraction greater than air and said angle α includes a range of angles, said range dependent upon a differential between the index of refraction of said cylinder and the index of refraction of air.

* * * * *